United States Patent
Sunayama et al.

(10) Patent No.: US 6,532,534 B1
(45) Date of Patent: Mar. 11, 2003

(54) INFORMATION PROCESSING APPARATUS PROVIDED WITH BRANCH HISTORY WITH PLURALITY OF DESIGNATION WAYS

(75) Inventors: Ryuichi Sunayama, Kanagawa (JP); Aiichiro Inoue, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/456,918

(22) Filed: Dec. 7, 1999

(30) Foreign Application Priority Data

Dec. 10, 1998 (JP) .......................................... 10-350925

(51) Int. Cl.[7] ................................................ G06F 9/38
(52) U.S. Cl. ...................................................... 712/240
(58) Field of Search ................................ 712/240, 238, 712/239

(56) References Cited

U.S. PATENT DOCUMENTS 5,978,906 A  * 11/1999  Tran ........................... 712/239

FOREIGN PATENT DOCUMENTS

| JP | 1-286031 | 11/1989 |
| JP | 2-71328 | 3/1990 |
| JP | 4-175825 | 6/1992 |
| JP | 6-67880 | 3/1994 |

OTHER PUBLICATIONS

"Improving Instruction Cache Branch Prediction with Target Addresses," *IBM Technical Disclosure Bulletin*, vol. 3, No. 7, pp. 497–498, Jul. 1993.*

Michaud et al., "Trading Conflict and Capacity Aliasing in Conditional Branch Predictors," Proceedings of the 24th International Symposium on Computer Architecture, ACM, vol. 25, Iss. May 1, 1997, 2, pp. 292–303, Jun. 1997.*

* cited by examiner

*Primary Examiner*—William M. Treat
(74) *Attorney, Agent, or Firm*—Staas & Halsey LLP

(57) ABSTRACT

The present invention relates to an information processing apparatus provided with a branch history. An object of the present invention is to automatically designate a way in which an entry to be data-processed exists among a plurality of ways with which the branch history is provided, and is to speed up the process. In order to accomplish this objective, the present invention comprises an instruction fetch unit attaching way designation information designating a way in which the entry to be data-processed exists to the address of an instruction, and provides the information to an instruction execution unit in preparation for the case where the instruction fetched from a storage unit is a branch instruction and the data process of a branch history corresponding to the branch instruction is required.

15 Claims, 13 Drawing Sheets

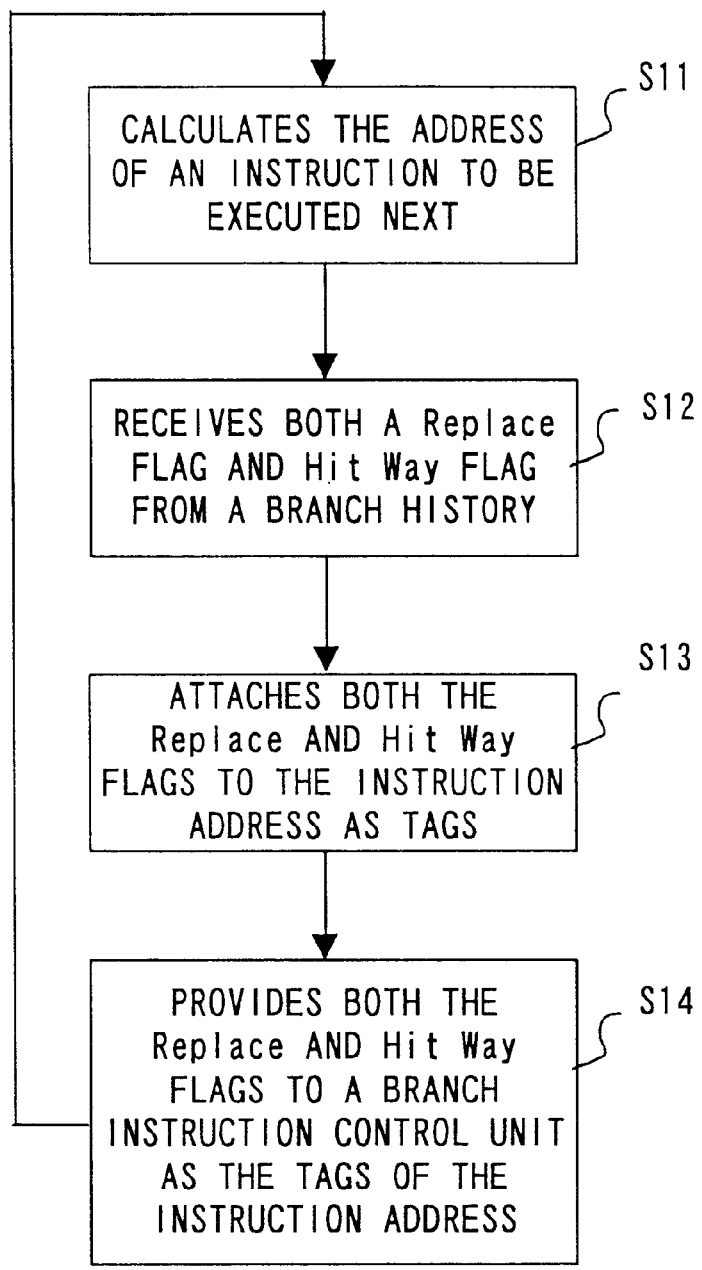
F I G. 6

| RPL_FLAG OF WAY0 | RPL_FLAG OF WAY1 | WAY SELECTED AT THE TIME OF A NEW ENTRY REGISTRATION | UPDATE OF A RPL_FLAG AT THE TIME OF NEW ENTRY REGISTRATION | UPDATE OF A RPL_FLAG AT THE TIME OF ENTRY DELETION |
|---|---|---|---|---|
| 0 | 0 | WAY0 | WAY0→1 | WAY1→1 |
| 1 | 0 | WAY1 | WAY1→1 | WAY0→0 |
| 1 | 1 | WAY0 | WAY0→0 | WAY1→0 |
| 0 | 1 | WAY1 | WAY1→0 | WAY0→1 |

FIG. 9

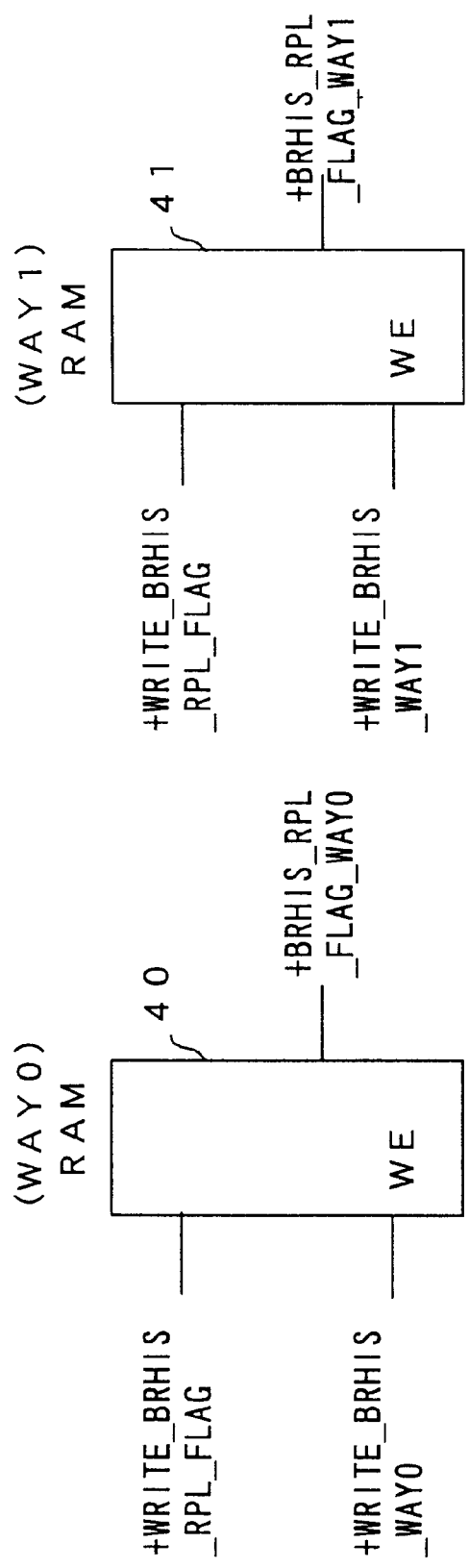

INFORMATION PROCESSING APPARATUS PROVIDED WITH BRANCH HISTORY WITH PLURALITY OF DESIGNATION WAYS

BACKGROUND OF THE INVENTION

1. Field of the Invention

The present invention relates to an information processing apparatus and in particular an apparatus provided with a branch history with a plurality of ways to automatically designate a way in which an entry to be data-processed exists and to speed up the process when a branch history in which both the instruction address of a branch instruction itself executed before and the instruction address of a branch destination are registered has a plurality of ways.

2. Description of the Related Art

An out-of-order process method can be used as one method for improving the efficiency of an information processing apparatus. In an information processing apparatus adopting the out-of-order process method, a subsequent instruction string is sequentially inputted to a plurality of pipelines without waiting for the completion of the execution of one instruction, and the performance is improved by executing processes in parallel.

However, even in the information processing. apparatus adopting the out-of-order process method, if the execution result of a preceding instruction affects the execution of a subsequent instruction, the execution of the subsequent instruction cannot be started unless the execution of the preceding instruction is completed. If the process of the preceding instruction causes delay, the subsequent instruction cannot be executed, the completion of the preceding instruction continues to be waited for, disorder occurs in a pipeline and the performance is degraded.

For a typical example of the instruction above, a branch instruction is listed. In the branch instruction, it is unknown whether a branch is established until the execution is completed, and even when the branch is established, the target address of a branch destination is unknown. Therefore, if a preceding instruction is a branch instruction, a subsequent instruction enters a waiting state and disorder occurs in a pipeline. For this reason, the process of the branch instruction must be sped up using a branch history.

If a branch is established in an branch instruction of which the execution is already completed, the branch history is used to register the instruction address of the branch instruction itself and the instruction address of branch destination, that is, a target address in pairs. Then, if an instruction fetched from a memory device, such as a main memory device, cache memory, and so on, is a branch instruction, the content of the branch history is retrieved. If the address of the instruction is already registered, the process of the branch instruction is started using the registered target address as a predictive branch destination address prior to the judgment on whether a branch is actually established.

Both the instruction address of a branch instruction which is not registered in the branch history and in which a branch is established and the branch destination address must be registered. If the branch instruction address, that is, the target address is modified due to some cause, the predictive branch destination address as the retrieval result of the branch history becomes invalid. In that case, in some cases, the registered target address must be updated and in other cases, an entry in which the instruction address of the branch instruction and the instruction address of the branch destination are registered in pairs must be deleted. Furthermore, if the prediction of a branch establishment failed or if the target address as a branch destination was wrong, information indicating the fact must be stored for each entry.

If a conventional branch history has a plurality of ways, information on the way where an entry in which both the instruction address of a branch instruction itself and a target address should be newly registered exists or on the way where an entry to be updated or deleted exists must be stored in another memory, or the direct retrieval of the branch history must be carried out every time the new registration, update or deletion of an entry is required.

If a separate memory is prepared, the circuit area of the entire information processing apparatus becomes large, and a waiting time for extracting information required to designate a way occurs, which are problems.

If the branch history is directly retrieved, the predictive branch destination address of a branch instruction fetched from a main memory device, and so on, that is, a target address, cannot be searched for while the branch history is retrieved. Therefore, the entire process is temporarily stopped, the performance is greatly degraded and a branch history cannot be effectively utilized, which also is a problem.

SUMMARY OF THE INVENTION

An object of the present invention is to automatically designate a way in which a new entry to be registered in a branch history with a plurality of ways, or an entry to be data-updated or data-deleted exists, without preparing another memory and without directly retrieving the branch history and to effectively utilize a branch history.

In the first aspect of the present invention, an information processing apparatus comprises an instruction fetch unit. The instruction fetch unit attaches way designation information designating a way in which an entry to be data-processed exists to the address of an instruction and provides the way designation information to an instruction execution unit executing the instruction in the information processing apparatus in preparation for the case where an instruction fetched from a memory device, such as a main memory device, cache memory, and so on, is a branch instruction and the data process of the branch history corresponding to the branch instruction is required.

BRIEF DESCRIPTION OF THE DRAWINGS

FIG. 6 is a flowchart showing the detailed process of an instruction fetch unit;

FIG. 9 shows both the designation of a way using a replace flag and the update of the replace flag;

FIG. 13A shows the configuration of a part of a replace group update circuit (No. 2); and FIG. 13B shows the configuration of a part of a replace group update circuit (No. 3).

DESCRIPTION OF THE PREFERRED EMBODIMENT

The detailed preferred embodiment according to the present invention is described below with reference to the drawings.

Figure 1:
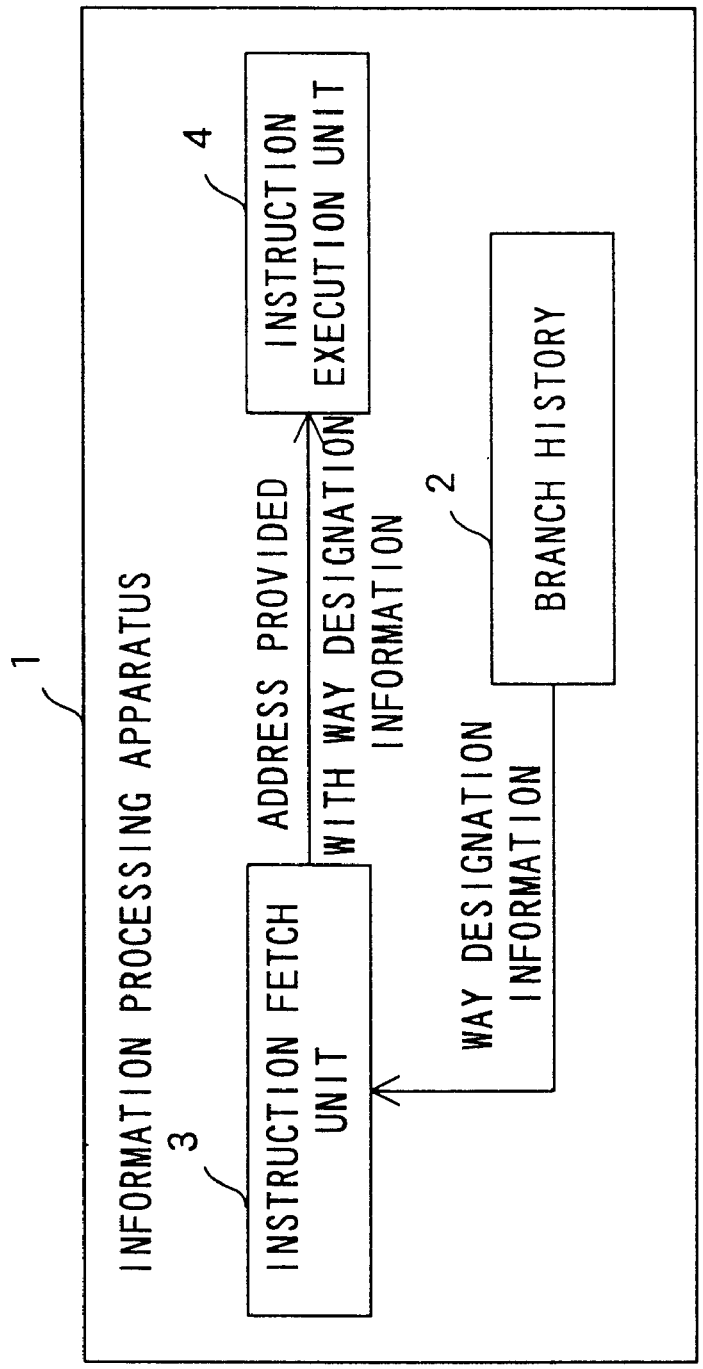
FIG. 1 shows the basic configuration of the present invention.

FIG. 1 shows the basic configuration of the present invention. FIG. 1 shows the basic configuration of an information processing apparatus provided with a branch history with a plurality of ways.

In FIG. 1, an information processing apparatus 1 comprises a branch history 2 with a plurality of ways. An instruction fetch unit 3 attaches way designation information designating a way in which an entry to be data-processed exists to the address of a fetched instruction in preparation for the case where the instruction fetched from a memory device, such as a main memory device, cache memory, and so on, is a branch instruction and the data process of a branch history corresponding to the branch instruction is required and provides the way designation information to an instruction execution unit 4 executing instructions in the information processing apparatus 1.

In the preferred embodiment of the present invention, in some cases, when it is found that a branch is established by executing a branch instruction, the data process of the branch history 2 is a new registration in which the instruction address of a branch instruction itself and the branch destination of the instruction address are registered in the branch history in pairs and the above-described way designation information designates a way in which a new entry to be registered exists.

In this case, a system can also be configured in such a way that the way designation information is a flag indicating a way in which a new entry is created, for example, a replace flag. Alternatively, the branch history can comprise a flag update unit updating the flag, and when a new entry should be created in the branch history 2, the flag update unit updates a flag so as to designate a way in which the newly created entry does not exist and provides the information to the instruction fetch unit 3 as way designation information to be attached to the instruction address described earlier.

A system can also be configured in such a way that the instruction fetch unit 3 attaches way designation information designating a way in which the new entry to be registered described earlier exists to the address of an instruction before a check on whether an entry in which the address of an fetched instruction exists in the branch history 2, is completed.

In the preferred embodiment of the present invention, a system can also be configured in such a way that the data process of the branch history described earlier is the update of data already registered in the branch history 2, and way designation information designates a way in which an entry to be data-processed exists.

In this case, a system can also be configured in such a way that the way designation information is a flag designating a way in which an entry to be data-updated exists, for example, a hit way flag. Alternatively, when an entry in which the address of a fetched instruction is registered is detected in the branch history 2, a flag designating a way in which the detected entry exists can be attached to the instruction address by the instruction fetch unit 3.

In the preferred embodiment of the present invention, a system can also be configured in such a way that the data process of the above-described branch history is the deletion of data already registered in the branch history, and the way designation information designates a way in which an entry to be data-deleted exists.

In this case, a system can also be configured in such a way that the way designation information is a flag designating a way in which an entry to be data-deleted exists, for example, a hit way flag. Alternatively, when an entry in which the address of a fetched instruction is registered is detected in the branch history 2, a flag designating a way in which the detected entry exists can be attached to the instruction address by the instruction fetch unit 3.

The information processing apparatus can also further comprise a branch history control unit providing both information needed for a data process and way designation information attached to the instruction address to the brand history 2 when the data process of a branch history is required by the execution of a branch instruction.

In this case, the information processing apparatus also comprises a data process unit executing a data process of a target entry in the branch history corresponding to both information needed for a data process provided by the branch instruction control unit and way designation information.

In this case, a data process unit can also execute the data process of a target entry, for example, the registration of a new entry, or the data update or data deletion of an already existing entry in one cycle of the information processing apparatus.

As described above, according to the present invention, if the data process of a branch history corresponding to an instruction fetched from a main memory device, and so on, is required, way designation information designating a way in which a target entry exists is attached to an instruction address, and if the data process of the branch history, for example, the registration of a new entry, or the data update or data deletion of an already existing entry is actually required, a way in which an entry to be data-processed exists can be automatically identified.

Figure 2:
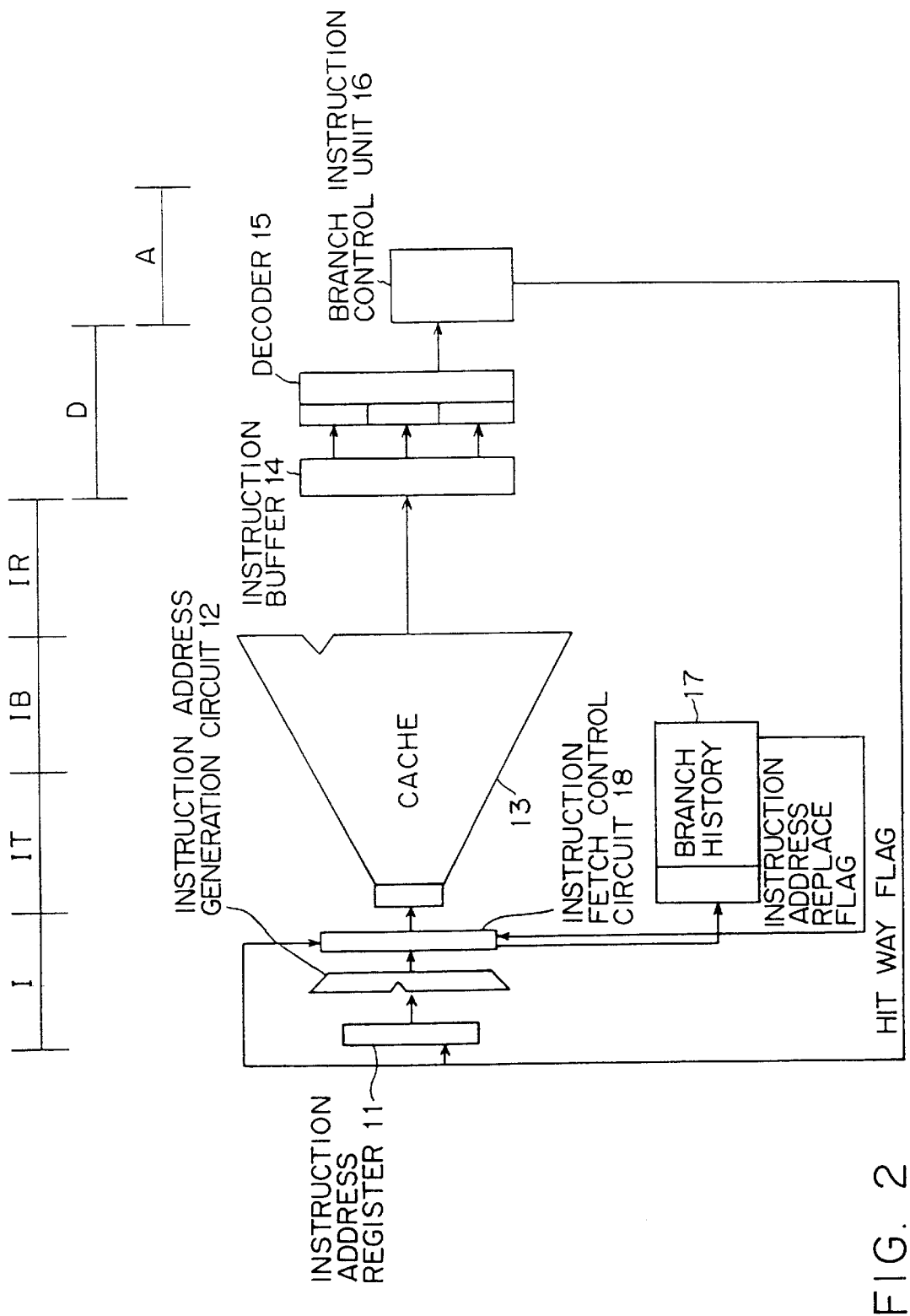
FIG. 2 shows the overall configuration of an information processing apparatus according to the present invention.

FIG. 2 shows the overall configuration of an information processing apparatus according to the present invention, specifically an information processing apparatus provided with a branch history generally with a plurality of ways. In FIG. 2, only parts directly related to the present invention in the information processing apparatus are shown.

In FIG. 2, an instruction address register 11, an instruction address generation circuit 12 and a cache 13 are used to perform an instruction fetch pipeline operation. The instruction fetch pipeline is composed of a request issuance cycle I of an instruction fetch, access cycle IT to a tag and a TLB, access cycle IB to a buffer and result output cycle IR.

Following the pipeline process of the instruction fetch, the pipeline process of an instruction execution is executed. The instruction execution pipeline is composed of a decode cycle D of an instruction, address calculation cycle A, address conversion cycle T, address cycle to a buffer B, execution cycle E, check cycle C and result write cycle W. However, in FIG. 2, only cycles D and A are shown.

In the decode cycle D, an instruction is provided from an instruction buffer 14 to a decoder 15, and the instruction is decoded. Then, if the provided instruction is, for example, a branch instruction, the instruction address of a branch destination, specifically the correct value of a target address is calculated in the address calculation cycle, and the result is provided to a branch instruction control unit 16.

If the registration of a new entry is necessary, both the instruction address of a branch instruction itself and the instruction address of a branch destination are provided from the branch instruction control unit 16. If the update or deletion of an entry is necessary, data needed for the process are provided to a branch history 17, or for example, a correct branch destination address calculated in the address calculation cycle is provided to the instruction address register 11 or cache 13. An instruction address, a replace flag and hit way flag are provided from the branch history 17 to an instruction fetch unit, for example, an instruction fetch control circuit 18 as described later.

In the preferred embodiment of the present invention, a flag attached to the instruction address as a tag is used to designate a way in which a new entry should be created or a way in which an entry to be updated or deleted exists when a new entry is registered, or the data of an entry are updated or deleted in a branch history with a plurality of ways, for example, two ways.

In this preferred embodiment, both a replace flag and a hit way flag are used as such flags. If the address of an fetched instruction is inputted to an instruction buffer, the replace flag is attached to all instruction addresses as a tag. This replace flag is used to designate a way in which a new entry should be registered.

After it is actually found that the instruction is a branch instruction, a branch is established and a branch destination address, that is, a target address is calculated in the address calculation cycle, this replace flag is provided from the branch instruction control unit 16 to the branch history 17 and is not modified before a new entry is actually registered. Therefore, a new entry is registered in a way designated by the replace flag attached to the address when the instruction is fetched.

If the branch history 17 is retrieved when the instruction is fetched and the instruction address of the instruction is detected from the branch history 17, the hit way flag is attached to the instruction address as a tag, as information indicating a way in which an entry where the detected instruction address is registered exists, like the replace flag, and is inputted to the instruction buffer 14.

If the update or deletion of data registered in the branch history 17 is required, specifically after the execution of a branch instruction is completed, the update or deletion of an entry is carried out using both information for the data update or deletion provided from the branch instruction control unit 16 to the branch history 17 and the hit way flag. The deletion of an entry described here is not the cancellation of information itself registered in the branch history, but is the update of information indicating whether the entry is valid, for example, the content of a valid bit.

In this way, in this preferred embodiment, since when an entry is newly registered, updated or deleted, a way in which the entry exists is already designated by the replace flag or hit way flag, there is no need to directly retrieve data from another memory or the branch history, and immediately necessary data can be written in the branch history. Therefore, a time shortening the branch history retrieval process for the branch prediction of an instruction fetched from a main memory device becomes extraordinarily short. For example, if it is assumed that a data write in the branch history 17 can be carried out in one cycle, a time shortening the branch history retrieval for the branch instruction prediction becomes only one cycle.

Figure 3:
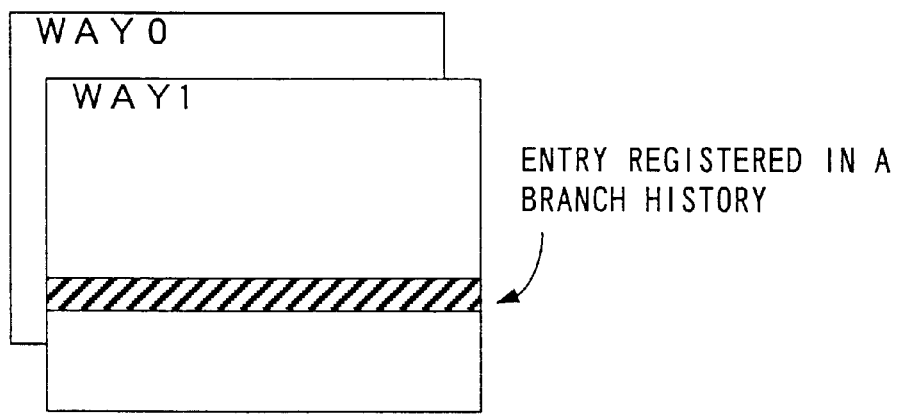
FIG. 3 shows a plurality of ways of a branch history.

FIG. 3 shows the configuration of a branch history in this preferred embodiment. As shown in FIG. 3, the preferred embodiment is described assuming that the branch history has two ways, way 0 and way 1, and that the information processing apparatus adopts an out-of-order process method.

Figure 4:
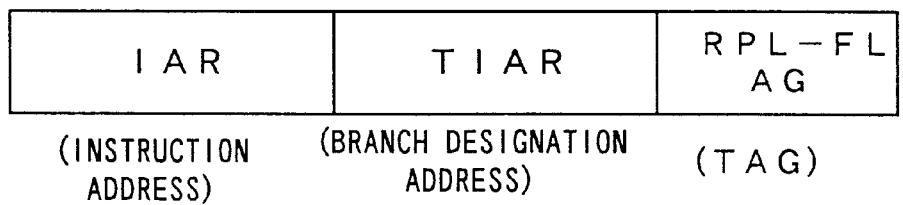
FIG. 4 shows a stored content example of an entry in a branch history.

FIG. 4 shows an example data structure of an entry registered in a branch history. As shown in FIG. 4, a replace flag is registered as tag information in addition to the instruction address of a branch instruction itself and the instruction address IAR of a branch destination, that is, a target address TIAR.

Figure 5:
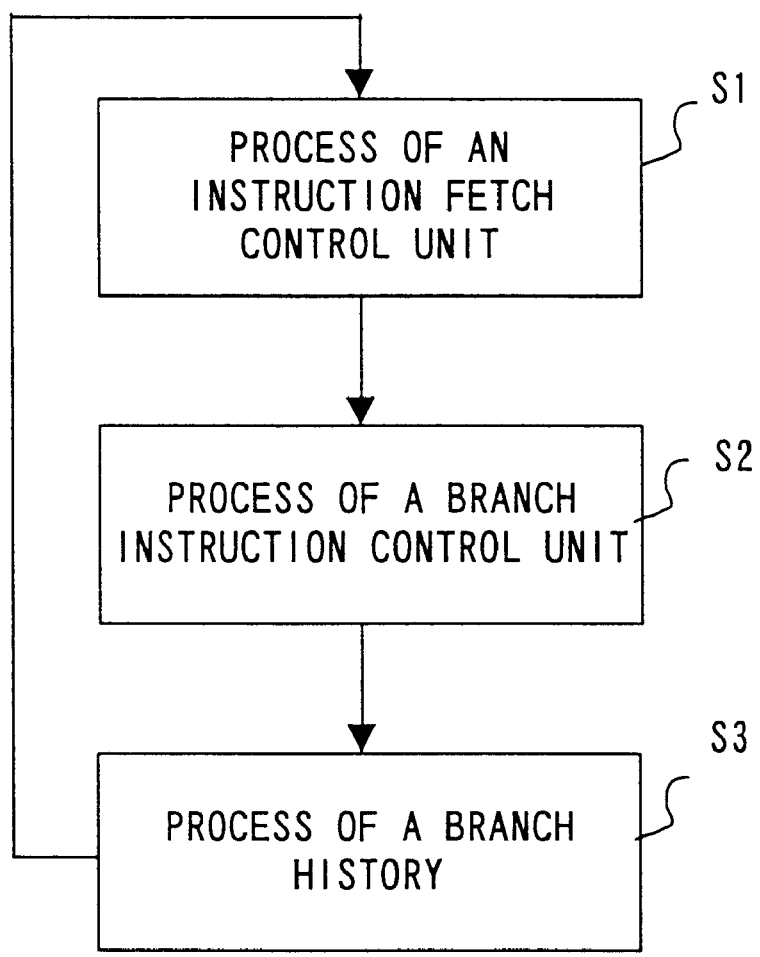
FIG. 5 is a flowchart showing the overall process of a preferred embodiment according to the present invention.

FIG. 5 is a flowchart showing the overall process of a preferred embodiment according to the present invention. As shown in FIG. 5, first, in step S1, the process of the instruction fetch control unit is executed. Although the process is described later with reference to FIG. 3, as a result of the above execution, both a replace flag and a hit way flag are attached to an instruction address as a tag.

Tags of valid, dizzy, giddy and branch history hit can also be attached in addition to the replace and hit way flags. The valid bit indicates that an entry registered in a branch history is valid, and the initial value is 0. The dizzy bit indicates that a branch was not established when a branch instruction which is indicated by the instruction address registered in an entry was previously executed, and the initial value is 0.

The giddy bit indicates that a target address registered in an entry was wrong due to some cause when the branch instruction was previously executed, and the initial value is 0. The branch history hit indicates whether the address of a fetched instruction has hit a branch history, and it specifically indicates whether the address is registered in the branch history 17, and the initial value is also 0. If as the result of retrieving the branch history 17 for the purpose of executing a branch instruction using a predictive branch destination address, the address has hit the branch history, the value becomes 1.

Figure 7:
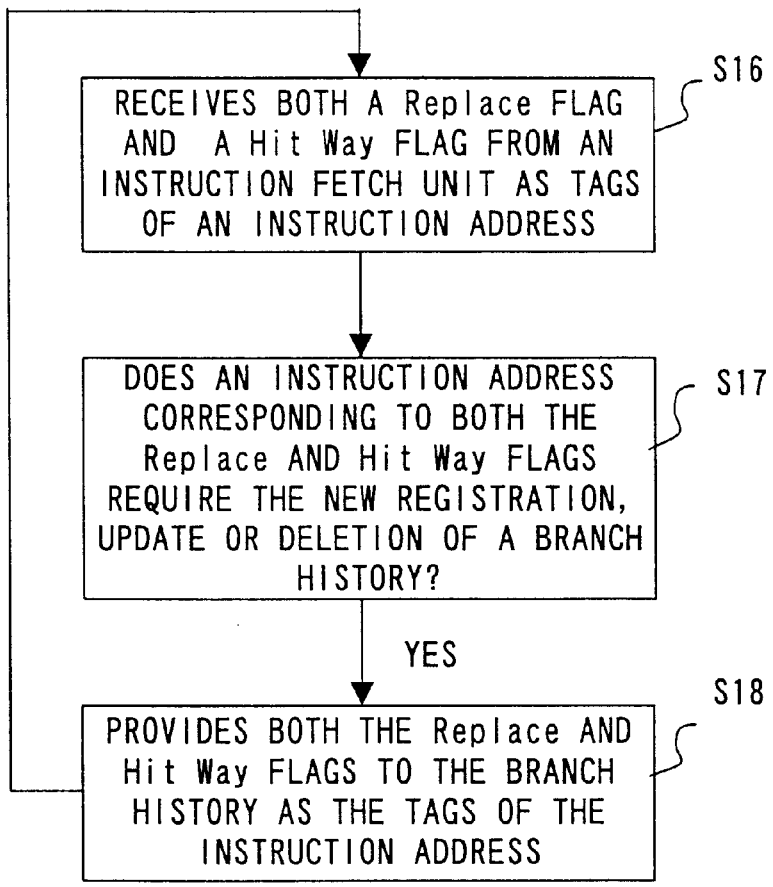
FIG. 7 a flowchart showing the detailed process of a branch instruction control unit.

Then, in step S2, the process of the branch instruction control unit is executed. In this process, as shown in FIG. 7, it is judged whether the new registration, or update or deletion of an entry in a branch history is necessary, and if it is judged that the entry is necessary, necessary information is provided to the branch history.

Figure 8:
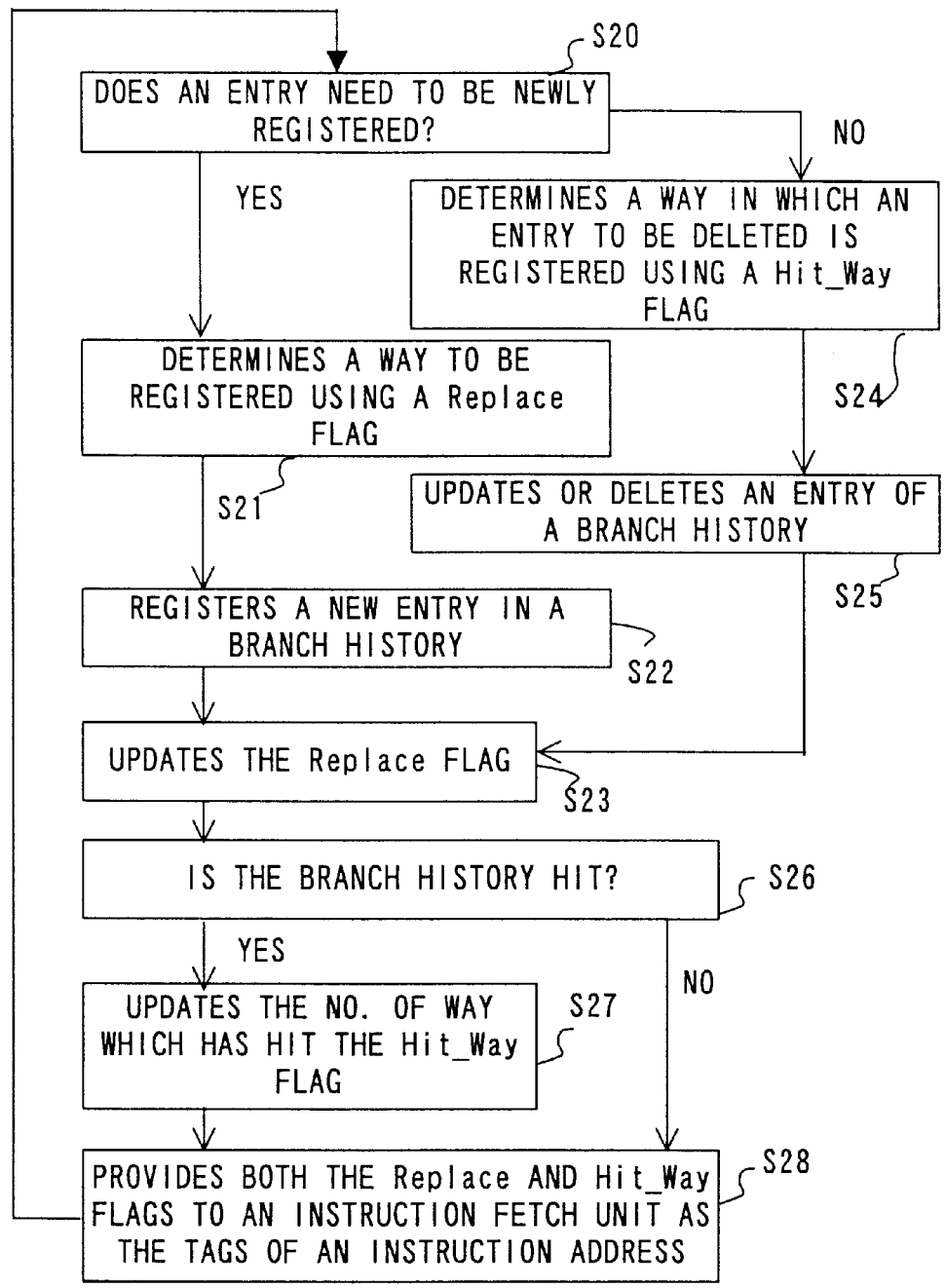
FIG. 8 is a flowchart showing the detailed process of a branch history.

Then, in step S3, the process of a branch history is executed. In this process, as shown in FIG. 8, the new registration, or update or deletion of the entry is executed, and both a replace flag and a hit way flag are provided to the instruction fetch unit.

The new registration, update and deletion of an entry in a branch history are described below. The new registration, update and deletion of an entry are executed in a branch history after a branch instruction is executed, and when an entry is newly registered, updated and deleted, the branch history is not retrieved, which is a major feature of the present invention.

The new registration of an entry is carried out if the value of a branch history bit is 0, an instruction indicated by an instruction address is a branch instruction and a branch is established. In which way a new entry is registered is designated by a replace flag. At this time, the value of a hit way flag can be 0 or 1.

The update of an entry is carried out if the value of a branch history bit is 1, for example, if the modification of a dizzy bit or giddy bit is required. When an entry is updated, the value of a hit way flag is valid and an entry is updated in a way designated by this value.

The deletion of an entry means to modify the value of a valid bit from 1 to 0, as described above. For example, the first condition for carrying out the deletion is the requirement that two predictions as to the establishment of a branch fail consecutively. The second condition is the requirement that a prediction as to the establishment of a branch fails and the target address is wrong. The third condition is the requirement that although an instruction is not actually a branch instruction, the address of the instruction is wrongly registered in a branch history.

FIG. 6 is a flowchart showing the detailed process of an instruction fetch unit. In FIG. 6, in step S11 the address of the instruction to be extracted from a main memory device, and so on, and to be executed is calculated, in step S12 both a replace flag and a hit way flag are received from a branch history, in step S13 the two flags are attached to an instruction address as tags and in step S14 the contents of both the replace flag and hit way flag are provided to the branch instruction control unit 16, for example, via the decoder 15 shown in FIG. 2, as the tags of the instruction address.

In this preferred embodiment, when the address of a fetched instruction is provided to the instruction buffer 14, specifically in the IR state of an instruction fetch pipeline, both the replace flag and hit way flag are managed as tags. At this point, whether the fetched instruction is a branch instruction or not, and even if the instruction is a branch instruction, whether the branch is established or not, cannot be judged. Therefore, both the replace flag and the hit way flag are attached to the addresses of all instructions.

FIG. 7 is a flowchart showing the detailed process of the branch instruction control unit 16. In FIG. 7, in step S16 the contents of both the replace flag and the hit way flag are received from the instruction fetch unit, for example, via both the instruction buffer 14 and the decoder 15, as tags of the instruction address, in step S17 whether the new registration, update or deletion of an entry is required in a branch history concerning an instruction corresponding to these two flags is judged and, if required, in step S18 the contents of both the replace flag and the hit way flag are provided to the branch history 17 along with data required to newly register, update or delete an entry.

The branch instruction control unit 16 exercises control on an branch instruction. A process using the contents of both a replace flag and a hit way flag becomes necessary when a branch instruction with an execution that is already completed exists and when the new registration of an entry, or the update or deletion of information is required as a data process of a branch history concerning the branch instruction. Therefore, only when such a data process is required, the instruction address of the instruction, the contents of both the replace flag and the hit way flag, and information needed for the data process are provided from the branch instruction control unit 16 to the branch history 17.

The branch history 17 judges which of the new registrations, and the update and deletion of data is required, based on the instruction address, the contents of both the replace flag and the hit way flag, and information about the data process which are provided from the branch instruction control unit 16. Then, the branch history 17 executes the process of a new registration, or update or deletion of an entry in a way designated by the two flags, updates the replace flag, and provides the updated replace flag to the instruction fetch unit.

In a flowchart showing the detailed process of the branch history shown in FIG. 8, first, in step S20 whether the registration of a new entry is required is judged, if required, in step S21 a way in which an entry should be registered is determined based on the content of the replace flag, in step S22 a new entry is registered, and then the flow proceeds to step S23.

If in step S20 the registration of a new entry is not required, in step S24 a way in which an entry to be data-updated or data-deleted exists is determined based on the content of the hit way flag, in step S25 the update or deletion of the entry is carried out, and then the flow proceeds to step S23.

In step S23, the update of the replace flag is carried out and the updated replace flag is attached to the next instruction to be fetched, in step S26 whether the next fetched instruction hits a branch history is judged. In step S27, if the instruction hits a branch history, the content of the hit way flag is updated so as to indicate the number of hit way, and if the instruction does not hit a branch history, no process is executed. Then, in step S28 the contents of both the replace flag and the hit way flag are provided to the instruction fetch unit as tags to be attached to an instruction address.

Next, the designation (selection) of a way based on the content of a replace flag in this preferred embodiment according to the present invention, and so on, is described. FIG. 9 shows a way designation based on the content of a replace flag at the time of new entry creation, and so on. In FIG. 9, it can be assumed that the replace flag of way 0 indicates the 0-th bit of a replace flag of two bits and that the replace flag of way 1 indicates the first bit of a replace flag of two bits. Specifically, if a replace flag is 00, way 0 is designated at the time of new entry registration; if the replace flag is 10, way 1 is designated; if the replace flag is 11, way 0 is designated; and if the replace flag is 01, way 1 is designated.

Figure 10:
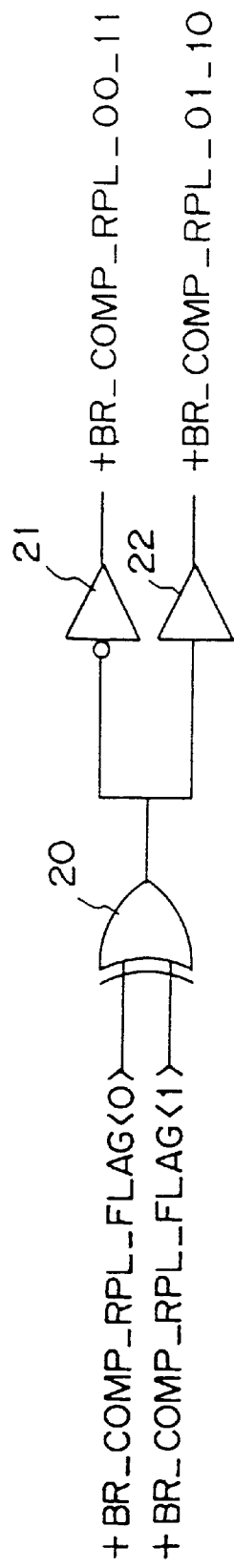
FIG. 10 shows the configuration of a part of a way selection circuit using a replace flag (No. 1)
Figure 11A:
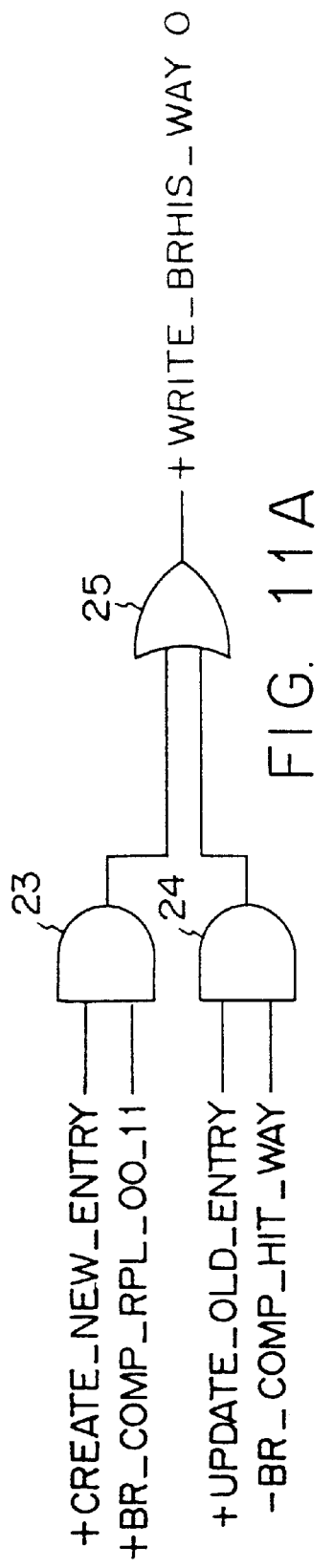
FIG. 11A shows the configuration of a part of a way selection circuit using a replace flag (No. 2)
Figure 11B:
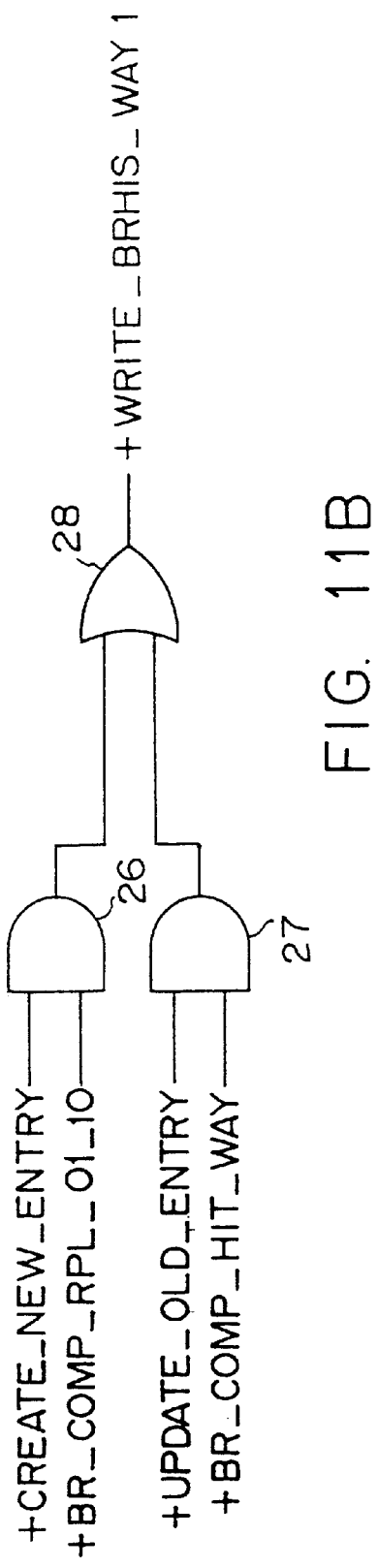
FIG. 11B shows the configuration of a part of a way selection circuit using a replace flag (No. 3)

FIGS. 10, 11A and 11B show examples of way selection circuits for realizing the way selection (designation) based on the content of a replace flag. In a circuit shown in FIG. 10, the 0-th bit and first bit of a replace flag provided from the branch instruction control unit 16 to the branch history 17 are inputted to an EXOR gate 20 as signals BR_COMP_RPL_FLAG<0> and <1>, respectively. If the values of the 0-th bit and first bit are different, specifically, a replace flag is 01 or 10, a signal BR_COMP_RPL_01_10 is outputted from a buffer 22, and if the values of the 0-th bit and first bit are the same, specifically a replace flag 00 or 11, a signal BR_COMP_00_11 is outputted from an inverter 21.

If in FIG. 11A both the output of the inverter 21 shown in FIG. 10 and a signal "Create a new entry" indicating that a new entry should be created are inputted in an AND gate 23, a signal WRITE_BRHIS_WAY0 indicating that a way in which a new entry should be created is way 0 is outputted from an OR gate 25. If both a signal "Update an old entry" indicating that the data of an entry should be updated or deleted and a signal BR_COMP_HIT_WAY indicating that a way in which an instruction hits a branch history at the time of branch history retrieval as the content of a hit way flag is way 0, are inputted to an AND gate 24 as L, a signal designating way 0 is similarly outputted from the OR gate 25.

If in FIG. 11B both the output of the buffer 22 and a signal "Create a new entry" indicating that a new entry should be created are inputted to an AND gate 26, a signal indicating that a way in which a new entry should be created is way 1 is outputted from an OR gate 28.

If both a signal "Update an old entry" and a signal indicating that the content of a hit way flag is 1 are inputted to an AND gate 27 as H, a signal designating way 1 is similarly outputted from the OR gate 28.

Next, the update of a replace flag is described with reference to FIGS. 9, 12, 13A and 13B. As shown in FIG. 9, if a new entry is registered, a replace flag is updated in such a way that a way different from a way in which an entry was previously registered is designated when a new entry is registered next. Specifically, if a replace flag is 00 and a way in which a newly registered entry exists is way 0, the way 0 of the replace flag is updated in such a way that way 1 is designated next, specifically the bit 0 is updated from 0 to 1, and the update result of the replace flag becomes 10.

If the replace flag is 10, the way 1 of the replace flag is updated to 1 in such a way that way 0 is selected next, and the update result of the replace flag becomes 11. If the replace flag is 11, the way 0 of the replace flag is updated to 0, the update result becomes 01 and a way in which an entry is registered next becomes way 1. If the replace flag is 01, the way 1 of the replace flag is updated to 0, the update result of the replace flag becomes 00 and a new entry to be registered next is created in way 0.

In this way, a replace flag is updated in such a way that if an entry was created in way 0, a new entry is created in way 1 next, and if an entry was created in way 1, a new entry is created in way 0 next. Two ways are selected alternately and a new entry is registered in either of two ways alternately.

In the case where an entry is deleted, similarly the replace flag is updated in such a way that ways 0 and 1 are designated alternately. However, the replace flag is updated in an order the reverse of the creation of a new entry. Specifically, the replace flag is updated in such a way that if the replace flag is 00, the update result becomes 01; if the replace flag is 10, the update result becomes 00; if the replace flag is 11, the update result becomes 10; and if the replace flag is 01, the update result becomes 11.

Figure 12:
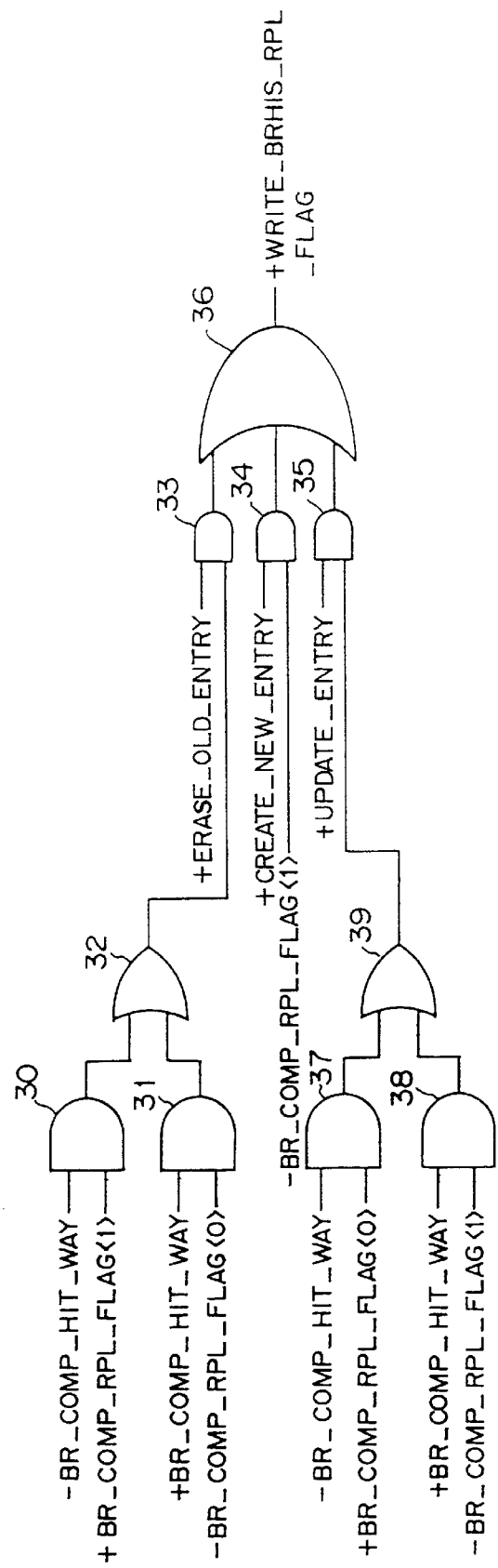
FIG. 12 shows the configuration of a part of a replace group update circuit (No. 1)

FIGS. 12, 13A and 13B show specific examples of the configuration of a replace flag update circuit. In FIG. 12, if the content of a hit way flag BR_COMP_HIT_WAY as an input to an AND gate 30 is L, that is, 0 and the first bit BR_COMP_RPL_FLAG<1> of the replace flag is H, that is, 1, the output of an OR gate 32 becomes H. If the output is inputted to an AND gate 33 along with a signal "Erase all entries" indicating that an entry has been deleted in a branch history, a signal WRITE_BRHIS_RPL_FLAG is outputted from an OR gate 36 as the update data of the replace flag.

If the content of the hit way flag as an input to an AND gate 31 is H, that is, 1 and the 0-th bit of the replace flag is L, that is, 0, the signals of the update data of the replace flag are similarly outputted from the OR gate 36.

Then, if both a signal "Create a new entry" indicating that a new entry has been registered in a branch history and a signal indicating that the first bit of the replace flag is L, that is, a plurality of 0 are inputted to an AND gate 34, a signal indicating the update data of the replace flag is outputted from the OR gate 36.

If both a signal indicating that a hit way flag is L, that is, 0 and a signal indicating that the 0-th bit of the replace flag is H, that is, a plurality of 1 are inputted to an AND gate 37, the output of an OR gate 36 becomes H. If the output is inputted to an AND gate 35 along with a signal "Update an entry" indicating that an entry has been updated in a branch history, a signal indicating the update data of the replace flag is outputted from the OR gate 36. Similarly, if a signal indicating that the content of the hit way flag is H, that is, a plurality of 1 and a signal indicating that the first bit of the replace flag is L, that is, a plurality of 0 are inputted to an AND gate 38, a signal indicating the update data of the replace flag is outputted from the OR gate 36.

FIG. 13A shows an example of a replace flag update data output circuit for way 0. In FIG. 13A, the output of the OR gate 36 shown in FIG. 12 is inputted to a random access memory (RAM) 40, and the content is written in the RAM 40 by providing a write-enable signal. Then, the content is outputted as the update data of the replace flag of way 0.

Similarly in FIG. 13B, the output of the OR gate 36 is inputted to a RAM 41, the content is written in the RAM 41 when a write-enable signal is inputted and the content is outputted as the update data of the replace flag of way 1.

Circuits shown in FIGS. 10, 11A and 11B show circuits designating (selecting) a way using a replace flag or hit way flag, and have no relation with the replace flag update circuits shown in FIGS. 12, 13A and 13B. Although in FIG. 13A the same nomenclature as the output of the OR gate 25 shown in FIG. 11A is used for a signal inputted to the write-enable terminal of the RAM 40, the signal is quite different from the output. Although in FIG. 13B the same nomenclature as the output of the OR gate 28 shown in FIG. 11B is used for a signal inputted to the write-enable terminal of the RAM 41, the signal is also quite different from the output.

In the circuits shown in FIGS. 12, 13A and 13B, the update of a replace flag at the time of new entry registration and the update of a replace flag at the time of the entry deletion, which are described in FIG. 9, are carried out by controlling a write-enable signal for the RAMs 40 and 41. If an entry is deleted by controlling the write-enable signal, for example, a new entry can be registered next in a way in which an entry becomes invalid by the deletion. If an entry is updated, overwrite in the entry can also be prevented.

Although the circuits shown in FIGS. 10, 11A and 11B and the circuits shown in FIGS. 12, 13A and 13B are assumed to be quite different, for example, the outputs of the OR gates 25 and 28 shown in FIGS. 10, 11A and 11B can also be used as write-enable signals for the RAMs 40 and 41 shown in FIGS. 13A and 13B. This has been described using, as an example, the update of a replace flag at the time of new entry registration.

If in FIG. 9 a replace flag is 00, the outputs of the AND gate 23 and OR gate 25 shown in FIG. 11A become H, and a write-enable signal for the RAM 40 shown in FIG. 13A is inputted. At this time, the outputs of the AND gate 34 and OR gate 36 shown in FIG. 12 become H, and as a result, as shown in FIG. 9, the replace flag of way 0 becomes 1 and the value of the replace flag after update becomes 10.

However, if in FIG. 9 the value of the replace flag is 10, the outputs of the AND gate 26 and OR gate 28 become H, a write-enable signal for the RAM 41 shown in FIG. 13B is inputted. At this time, the outputs of the AND gate 34 and OR gate 36 shown in FIG. 12 become H, and as a result, the replace flag of way 1 is updated to 1 and the replace flag after update becomes 11.

If the replace flag is 11 or 01, the outputs of the AND gate 34 and OR gate 36 shown in FIG. 12 become L, data to be written in the RAMs 40 and 41 by write-enable signals outputted by the OR gates 25 and 28, respectively, becomes 0, as a result, the replace flags of way 0 and 1 are updated to 0 and the value of the replace flag after update become 01 and 00, respectively.

As described in detail above, and according to the present invention, since it becomes unnecessary, for example, to store way designation information in another memory as in the conventional case, the overall circuit area of an information processing apparatus can be reduced. Since a time required to register a new entry, and to update and delete entry data in a branch history can be limited to the minimum possible, for example, one cycle, a time shortening a branch history retrieval carried out to predict a branch destination address corresponding to a branch instruction can be minimized, and a branch history can be more effectively utilized, which greatly contributes to the improvement of the process efficiency of an information processing apparatus provided with a branch history.

What is claimed is:

1. An apparatus provided with a branch history with a plurality of ways, comprising:

an instruction fetch unit attaching way designation information designating a way in which an entry to be data-processed to an address of an instruction, and providing the instruction to an instruction execution unit executing an instruction in the information processing apparatus in preparation for a case where the instruction is a branch instruction and a data process of a the branch history corresponding to the branch instruction is required, wherein the designating a way selects a way when revising an entry without employing a separate memory or without searching through the branch history.

2. The apparatus according to claim 1, wherein when it is found that a branch is established by an execution of a branch instruction, a data process of the branch history is a new registration registering both an instruction address of the branch instruction itself and an instruction address of a branch destination in a branch history and the way designation information designates a way in which an entry to be newly registered exists.

3. The apparatus according to claim 2, wherein the way designation information is a flag indicating a way in which an entry to be newly created exists.

4. The apparatus according to claim 3, further comprising:

a flag update unit in which the branch history updates a flag as the way designation information; wherein when a new entry is created in the branch history, said flag update unit updates the flag so as to designate a way in which the new entry does not exist, and provides the flag to said instruction fetch unit as way designation information to be attached to the instruction address.

5. The apparatus according to claim 3, further comprising:

a flag update unit in which the branch history updates a flag as the way designation information; wherein when an entry is deleted in the branch history, said flag update unit updates the flag so as to designate a way in which the deleted entry existed, and provides the flag to said instruction fetch unit as way designation information to be attached to the instruction address.

6. The apparatus according to claim 2, wherein before a check on whether an entry in which an address of the fetched instruction is already registered exists in the branch history is completed, said instruction fetch unit attaches way designation information designating a way in which an entry to be newly registered exists to an address of the instruction.

7. The apparatus according to claim 1, wherein a data process of the branch history is an update of data already registered in the branch history, and the way designation information designates a way in which an entry to be data-updated exists.

8. The apparatus according to claim 7, further comprising:

an instruction address retrieval unit checking whether an address of the fetched instruction is already registered in the branch history prior to an execution of the fetched instruction; wherein the way designation information is a flag indicating a way in which an entry to be data-updated exists; and when an entry in which an address of the fetched instruction is registered is detected, said instruction address retrieval unit provides a flag designating a way in which the detected entry exists to said instruction fetch unit as way designation information to be attached to the instruction address.

9. The apparatus according to claim 1, wherein a data process of the branch history is a deletion of data already registered in the branch history, and the way designation information designates a way in which an entry to be data-deleted exists.

10. The apparatus according to claim 9, further comprising:

an instruction address retrieval unit checking whether an address of the fetched instruction is already registered in the branch history prior to an execution of the fetched instruction; wherein the way designation information is a flag indicating a way in which an entry to be data-deleted exists; and when an entry in which an address of the fetched instruction is registered is detected, said instruction address retrieval unit provides a flag designating a way in which the detected entry exists to said instruction f etch unit as way designation information to be attached to the instruction address.

11. The apparatus according to claim 1, further comprising:

a branch instruction control unit providing both information needed for a data process and way designation information attached to an address of the instruction to the branch history when the data process of the branch history becomes necessary by an execution of a branch instruction.

12. The apparatus according to claim 11, further comprising:

a data process unit executing a data process of a target entry in the branch history corresponding to both information needed for a data process provided by said branch instruction control unit and way designation information.

13. The apparatus according to claim 12, wherein a data process of the target entry is a new registration, update or deletion of an entry.

14. The apparatus according to claim 13, wherein said data process unit executes a data process of the target entry in one cycle of the information processing apparatus.

15. An apparatus, comprising:

a branch history with a plurality of ways; and an instruction fetch means for attaching way designation information designating a way in which an entry to be data-processed to an address of an instruction, and providing the instruction to an instruction execution unit executing an instruction in the information processing apparatus in preparation for a case where the instruction is a branch instruction and a data process of a branch history is required corresponding to the branch instruction, wherein the designating a way selects a way when revising an entry without employing a separate memory or without searching through the branch history.

* * * * *